(12) United States Patent
Kump et al.

(10) Patent No.: US 6,175,658 B1
(45) Date of Patent: Jan. 16, 2001

(54) SPATIALLY-SELECTIVE EDGE ENHANCEMENT FOR DISCRETE PIXEL IMAGES

(75) Inventors: Kenneth S. Kump, Waukesha; Richard Aufrichtig, Wauwatosa, both of WI (US)

(73) Assignee: General Electric Company, Milwaukee, WI (US)

( * ) Notice: Under 35 U.S.C. 154(b), the term of this patent shall be extended for 0 days.

(21) Appl. No.: 09/113,653

(22) Filed: Jul. 10, 1998

(51) Int. Cl.[7] .................................................... G06K 9/40
(52) U.S. Cl. ........................ 382/266; 382/132; 382/140; 382/160
(58) Field of Search ..................... 382/128, 132, 382/173, 240, 254, 260, 266, 275, 302

(56) References Cited

U.S. PATENT DOCUMENTS

| | | | |
|---|---|---|---|
| 5,461,655 | 10/1995 | Vuylsteke et al. | 378/62 |
| 5,467,404 | 11/1995 | Vuylsteke et al. | 382/274 |
| 5,546,473 | 8/1996 | Buytaert et al. | 382/132 |
| 5,644,662 | 7/1997 | Vuylsteke | 382/302 |
| 5,739,922 | * 4/1998 | Matama | 382/260 |
| 6,018,596 | * 1/2000 | Wilkinson | 382/260 |

FOREIGN PATENT DOCUMENTS

| | | | |
|---|---|---|---|
| 0 368 162 A2 | 11/1989 | (EP) | G06F/15/68 |
| 0 444 874 A3 | 2/1991 | (EP) | G06F/15/68 |
| 0 527 525 A2 | 7/1992 | (EP) | G06F/15/68 |
| WO 98/55916 | 12/1998 | (WO) | G06F/5/00 |

\* cited by examiner

*Primary Examiner*—Thomas D. Lee
(74) *Attorney, Agent, or Firm*—Fletcher, Yoder; Christian G. Cabou; Phyllis Y. Price

(57) ABSTRACT

A discrete pixel image is enhanced to bring out particular features of interest such as edges. The enhancement includes decomposition of the original processed image data, enhancement by application of gain images to the decomposed images, and reconstruction of the enhanced image. The decomposition proceeds through a series of low-pass filters to arrive at decomposed images of progressively lower spatial frequencies. These decomposed images are then multiplied by gain images during the enhancement phase. Gain images for at least the higher spatial frequency level images are derived from lower spatial frequency level images. These spatial frequency-based gain images may be based upon operator inputs, including a spatial sensitivity function and an edge enhancement value. Lower spatial frequency level images may be processed by application of predetermined gain values. The reconstruction sequence recombines the decomposed images after application of the gains to arrive at an enhanced image of the same dimensions as the original image.

21 Claims, 3 Drawing Sheets

SPATIALLY-SELECTIVE EDGE ENHANCEMENT FOR DISCRETE PIXEL IMAGES

TECHNICAL FIELD

The present invention relates to digital imaging techniques and, more particularly, to techniques for enhancement of discrete pixel images, such as those produced in medical imaging systems.

BACKGROUND ART

A wide range of systems have been proposed and are currently in use for producing discrete pixel images. In such systems, data is gathered representative of characteristics of a large number of picture elements or pixels arranged in an array or matrix. For example, in digital radiography systems, signals are produced which are representative of a level or intensity of radiation received within each pixel region during an exposure. The signals are processed and filtered to provide consistent and meaningful information over the matrix of pixels. Following such processing, the data is used to reconstruct a useful composite image made up of the pixels. The particular filtering and processing of the signals may be adapted to various modalities and features of interest, so as to provide a user with meaningful information in their reconstructed image. In many medical applications, an attending physician or radiologist will consult the composite image for identification of internal features within a subject as defined by edges, textural regions, contrasted regions, and so forth.

Algorithms have been developed for digitally processing discrete pixel image data to enhance diagnostic portions of the image while suppressing noise. For example, in one known method pixel data is filtered through progressive low pass filtering steps. The original image data is thus decomposed into a sequence of images having known frequency bands. Gain values are applied to the resulting decomposed images for enhancement of image features, such as edges. Additional filtering, contrast equalization, and gradation steps may be employed for further enhancement of the image.

While such techniques provide useful mechanisms for certain types of image enhancement, they are not without drawbacks. For example, gains applied to decomposed images can result in inadvertent enhancement of noise present in the discrete pixel data. Such noise, when enhanced, renders the reconstructed image difficult to interpret, and may produce visual artifacts which reduce the utility of the reconstructed image, such as by rendering features of interest difficult to discern or to distinguish from non-relevant information.

There is a need, therefore, for an improved technique for discrete pixel image enhancement. In particular, there is a need for a technique which is capable of enhancing features of interest in such images, such as edges of structures, without enhancement of noise or other artifacts. There is also a particular need for an image enhancement technique which can be employed in existing systems, and which can be adjusted by users for various situations, depending upon the type of subject being imaged, the features of interest, and so forth.

DISCLOSURE OF THE INVENTION

The present invention provides a technique for enhancing digital pixel images designed to respond to these needs. The technique affords enhancement of particular features in the image as defined by the digital pixel data, while avoiding enhancement of noise and other artifacts. The technique applies feature enhancement gain factors which are based upon the level of an enhanced image in a decomposition pyramid. Gains employed for different levels in the decomposed images can be adjusted, with lower gains being employed for decomposed images at lower spatial frequency levels. The technique may be applied to images acquired through a range of imaging modalities. The technique is particularly well suited to enhancement of images acquired through digital X-ray systems.

In accordance with certain aspects of the technique, processed acquired pixel data for an image is filtered to decompose the image into a series of spatial frequency level images. The series of images includes images at progressively lower spatial frequency levels. A gain image for at least one of the spatial frequency images is derived from image data from a lower spatial frequency level. This gain is applied to the higher spatial frequency image to obtain an enhanced image for that spatial frequency level. Such gains may be derived for and applied to a series of the decomposed spatial frequency level images. Such spatial frequency-based gain images may be employed for spatial frequency level images at which valuable information, such as edge information, is expected to be found. Other lower spatial frequency level images may be processed by applying gains equal to unity or gains higher than or less than unity. The resulting images are then recombined to arrive at an enhanced image. The decomposition, enhancement, and reconstruction phases of the technique preferably produce an enhanced image of equal dimensions to the input image.

BEST MODE FOR CARRYING OUT THE INVENTION

Figure 1:
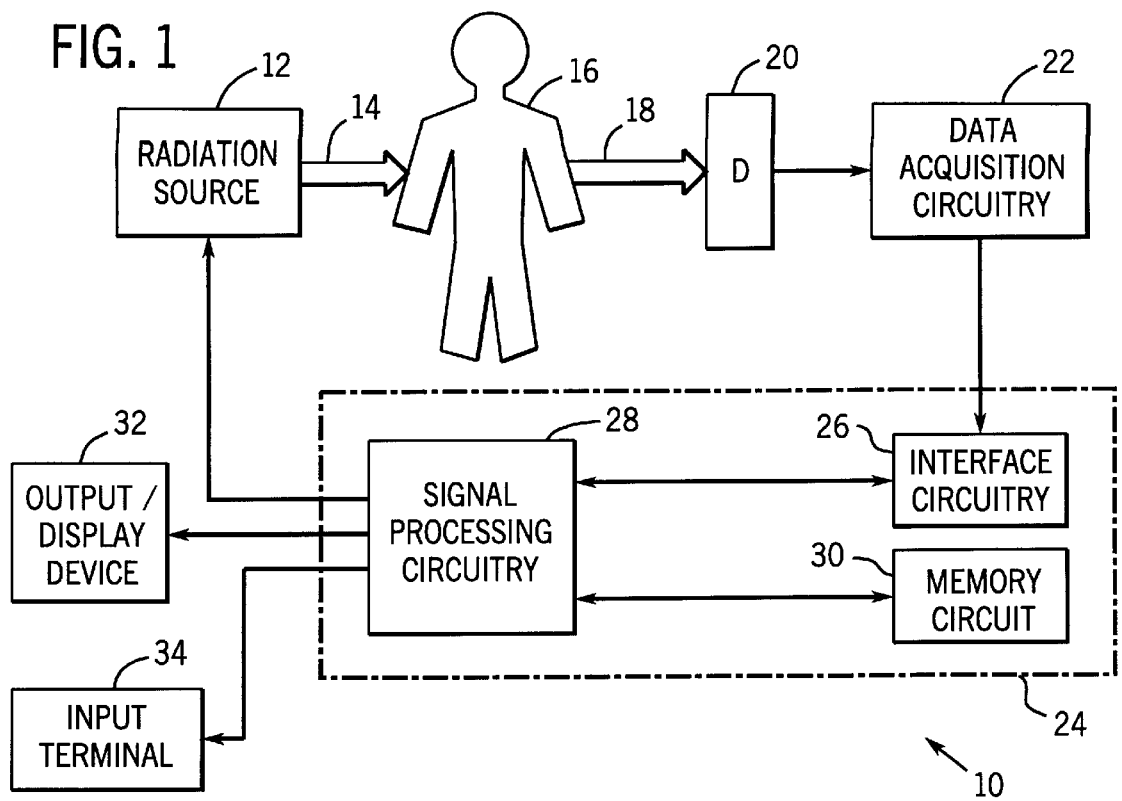
FIG. 1 is a diagrammatical representation of a digital X-ray imaging system for producing discrete pixel images of a subject of interest.

Turning now to the drawings, and referring first to FIG. 1, an imaging system 10 is illustrated diagrammatically in the form of a digital x-ray system. System 10 includes a controlled source of radiation 12 capable of emitting a stream 14 of radiation upon command. The stream of radiation is directed toward a subject of interest 16. A portion 18 of the radiation passes through the subject and impacts a detector 20. The detector, which includes an array of discrete picture elements or pixels generates signals representative of the amount or intensity of the radiation received within the bounds of each pixel region, and transmits the signals to data acquisition circuitry 22. Circuitry 22 processes the acquired signals, such as by appropriate filtering, dynamic range adjustment, and so forth, outputting a string of data representative of the radiation received by detector 20.

The digital signals output by a data acquisition circuitry 22 are transmitted to an image processing unit 24 where the signals are further processed to produce data representative of features of interest within subject 16. Thus, the signals from data acquisition circuitry 22 are transmitted first to interface circuitry 26 within unit 24. This interface circuitry may perform additional filtering functions, before forwarding the signals to signal processing circuitry 28. As is described in greater detail below, signal processing circuitry 28 performs a series of computations based upon the acquired and filtered signals. In particular, signal processing circuit 28 filters and enhances the pixel data so as to render the image defined by the collection of pixels more readily understandable or useful to an attending physician or radiologist.

Signals processed by circuitry 28, typically in the form of a series of digital values, are stored in a memory circuit 30 within unit 24. Memory circuit 30, which may include any suitable type of electronic memory, such as random access memory, read-only memory, dynamic random access memory, disk storage, and so forth, also preferably stores programming code implemented by signal processing circuit 28 for executing its preconfigured functions. Signal processing circuitry 28 may, in turn, include any suitable general purpose or application-specific microprocessor, CPU, or signal processor.

In addition to the image enhancement functions carried out by signal processing circuitry 28, such circuitry is also available for outputting or displaying composite images defined by acquired and processed pixel data on an output device as indicated by reference numeral 32. Such output or display devices may include conventional computer monitors, printers, and so forth. An input terminal 34 is also provided for communicating input parameters, image types, examination configures, and so forth to signal processing circuitry 28. Input terminal 34 may include a conventional keyboard, serial mouse, or any other suitable interface device. Terminal 34 may also include circuitry associated directly with a terminal screen for permitting selection or input of configuration parameters by touching appropriate locations in an on-screen display. Signal processing circuit 28 is further coupled to radiation source 12 for controlling the generation and transmission of radiation stream 14 as image data is desired.

Figure 2:
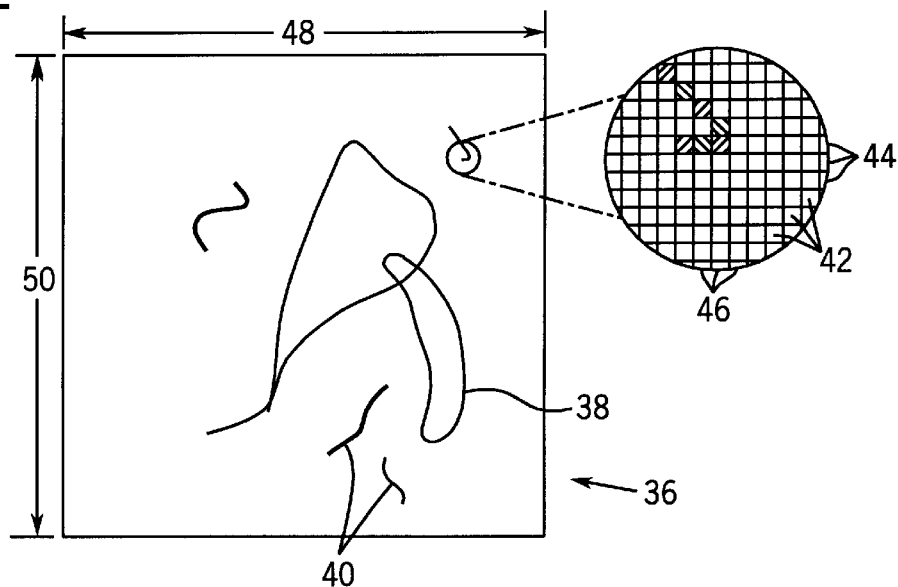
FIG. 2 is plan view of an exemplary discrete pixel image produced via the system of FIG. 1.

FIG. 2 represents an exemplary image matrix 24 defined by data acquired through system 10. As illustrated in FIG. 2, the matrix permits reconstruction of a composite image 38 in which particular features of interest 40 are defined by varying characteristics of adjacent pixels 42, typically gray level or color. Pixels 42 are arranged in a series of rows 44 and columns 46. The resulting image matrix thus includes a large number of such rows and columns defining an image width 48 and an image height 50. The particular dimensions of matrix 36 may depend upon such factors as the particular feature being imaged, the resolution desired in the image, and so forth. Moreover, system 10 may be configured to generate images of a number of different matrix dimensions, such as 2,048×2,048 pixels, 1,024×1,024 pixels, and so forth.

Figure 3:
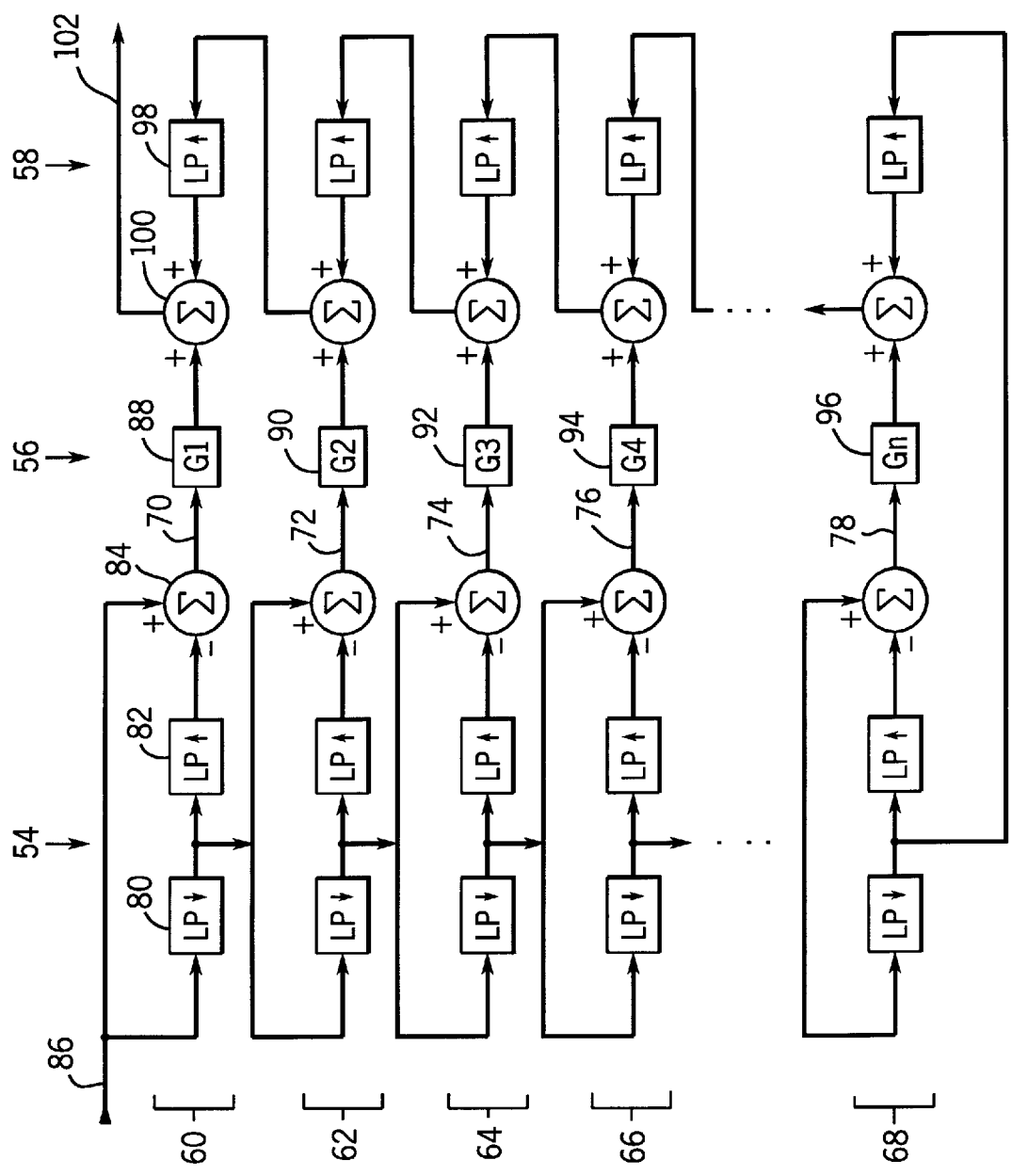
FIG. 3 is a diagrammatical representation of an image decomposition sequence for separating the image of FIG. 2 into decomposed images referenced by desired frequency bands.

System 10 preferably filters the acquired signals to enhance certain types of features in the image. Such enhancement is performed in such a way as to selectively emphasize the features, while avoiding amplification or enhancement of noise or other artifacts in the image. FIG. 3 illustrates a diagrammatical representation of exemplary functional signal processing circuitry employed for such enhancement. It should be noted that, while the elements illustrated in FIG. 3 and described below are represented as discrete components for processing image data, in practice, such components may be defined by appropriate programming code executed by signal processing circuitry 28.

As shown in FIG. 3, a filtering sequence 52 for spatially-selective edge enhancement of a discrete pixel image includes a decomposition phase, designated generally by the reference numeral 54, an enhancement phase 56, and a reconstruction phase 58. Decomposition phase 54 involves progressive decomposition of the image data into a series of spatial frequency images of progressively lower spatial frequency. As used herein, the term spatial frequency relates generally to the number of individual image components within a defined image area. Through the progressive decomposition of the image, filtering sequence 52 generates a series of decomposed images having different spatial frequencies. Each of these images is then enhanced by application of a gain image during enhancement phase 56. The resulting images are then recombined during reconstruction phase 58 to complete an enhanced image. The individual processing of the different spatial frequency levels of the decomposed images is represented in FIG. 3 by reference numerals 60, 62, 64, 66 and 68, with 68 being a final level of decomposition and processing. As noted, each progressive step or level produces an intermediate image having a progressively lower spatial frequency, as noted at reference numerals 70, 72, 74, 76, and 78.

As shown in FIG. 3, processing blocks for each spatial frequency level in decomposition phase 54 include a decimator (LP$\downarrow$) 80 and an interpolator (LP$\uparrow$) 82, represented by low-pass filters (only the filters of the highest spatial frequency level 60 being labeled in FIG. 3). These filters progressively combine data representing neighboring pixels of the immediately preceding image level in a manner generally known in the art. The filters output a first, filtered image which is employed in subsequent decomposition levels, as well as a second image which is subtracted from the input image for that spatial frequency level at a summer 84. Thus, at a highest level 60, the original processed image data 86 is fed to the decimating low pass filter 80, as well as to summer 84. The original image data is filtered at blocks 80 and 82, with the output of block 80 being passed on as input data to level 62. In this manner, the original processed image data is decomposed into the progressively lower spatial frequency images. In a present embodiment, each subsequent step or level in the decomposition phase produces an image which is half the size of the input image for that level. However, other reduction rates may be employed. Moreover, while the decomposition phase filtering may terminate at any desired level, in a present embodiment, such filtering is carried out until a single pixel (1×1) image is attained at lowest level 68.

The filtering sequence 52 then proceeds by applying (e.g., multiplying) each of the spatial frequency images by a gain image in enhancement phase 56. The gain images, designated in FIG. 3 by the numerals 88, 90, 92, 94, and 96, are assigned values which enhance specific features of the image, such as edges. Moreover, certain of the gain images are generated from data from lower spatial frequency levels. Thus, gain image 88, designated G1, is generated from image 72 resulting from the decomposition phase at level 62. Similarly, gain image 90, designated G2, is generated from image 74 resulting from processing at level 64. Any suitable number of levels in the filtering sequence 52 may employ such lower frequency-based gain images. For example, it has been found that in an image having original dimensions of 2,048×2,048 pixels, such lower spatial frequency-based gain images produce satisfactory edge enhancement when used at the first three levels of decomposition, such as levels 60, 62, and 64 in FIG. 3. Other lower levels may also employ this technique, or may be multiplied by a gain image having values of unity, or other values, either greater or less than unity.

Following application of the gain images at enhancement phase 56, the resulting enhanced images are recombined in reconstruction phase 58. As shown in FIG. 3, each step or level in the reconstruction phase includes interpolation of output data from an immediately preceding (i.e., lower) level in a block 98 (see level 60 in FIG. 3). The resulting image is added to the enhanced image in a summer 100 at each level. The resulting enhanced and reconstructed image data is then forwarded to the next (i.e., higher) level, until a reconstructed enhanced image 102 of the original dimensions is obtained.

It should be noted that, in particular applications, the image data need not be fully decomposed or reconstructed to the lowest levels. For example, where a series of lower spatial frequency images are to have a similar gain applied in phase 56, decomposition may be stopped at that level. The gain is then applied to the image at the terminal level, and reconstruction may be begin. Similarly, while as noted above, the higher level gains are derived from lower spatial frequency images resulting from decomposition, these could also be obtained based upon reconstructed images from a lower spatial frequency level (i.e., following application of the gain images during enhancement phase 56).

In the present embodiment, the lower spatial frequency-based gains are derived as follows. Following decomposition of the original filtered image data, signal processing circuit 28 applies an algorithm which may be expressed:

$$G_i(x,y) = \max(1.0, E_i \cdot s(O_j(x,y))),$$

where $G_i(x,y)$ is the value for each pixel in the gain image of level i to be determined, $E_i$ is a user-defined edge strength value greater than 1.0, S is a spatial sensitivity function which may be set by the user, and $O_j(x,y)$ is the value of each pixel in a lower spatial frequency level image j. It should be noted, thus, that the foregoing algorithm effectively maintains a value of unity in the derived gain images when the resulting computed value is less than unity. Also, the algorithm permits the user to effectively define a desired edge strength value, tending to increase or decrease the relative sharpness of the edges and the reconstructed enhanced image. Similarly, a spatial sensitivity function may be selected by the user to regulate the amount of influence in the gain calculation exerted by values of the lower spatial frequency image. The spatial sensitivity function could include linear functions, piecewise linear functions a sigmoidal function, and so forth. In a present embodiment, the values of S resulting from the function S may be set anywhere between 0 and 1. Moreover, the edge strength value or the spatial sensitivity function, or both, may be unique to specific spatial frequency levels (i.e., unique to individual levels 60, 62, and 64 in FIG. 3). Also, the particular level at which such spatial frequency-based gain images is derived may be a parameter which is user configurable. Thus, the user may select spatial frequency-based enhancement for one, two, three, or more levels, depending upon the enhancement desired and the frequency levels at which useful information or noise is anticipated.

Figure 4:
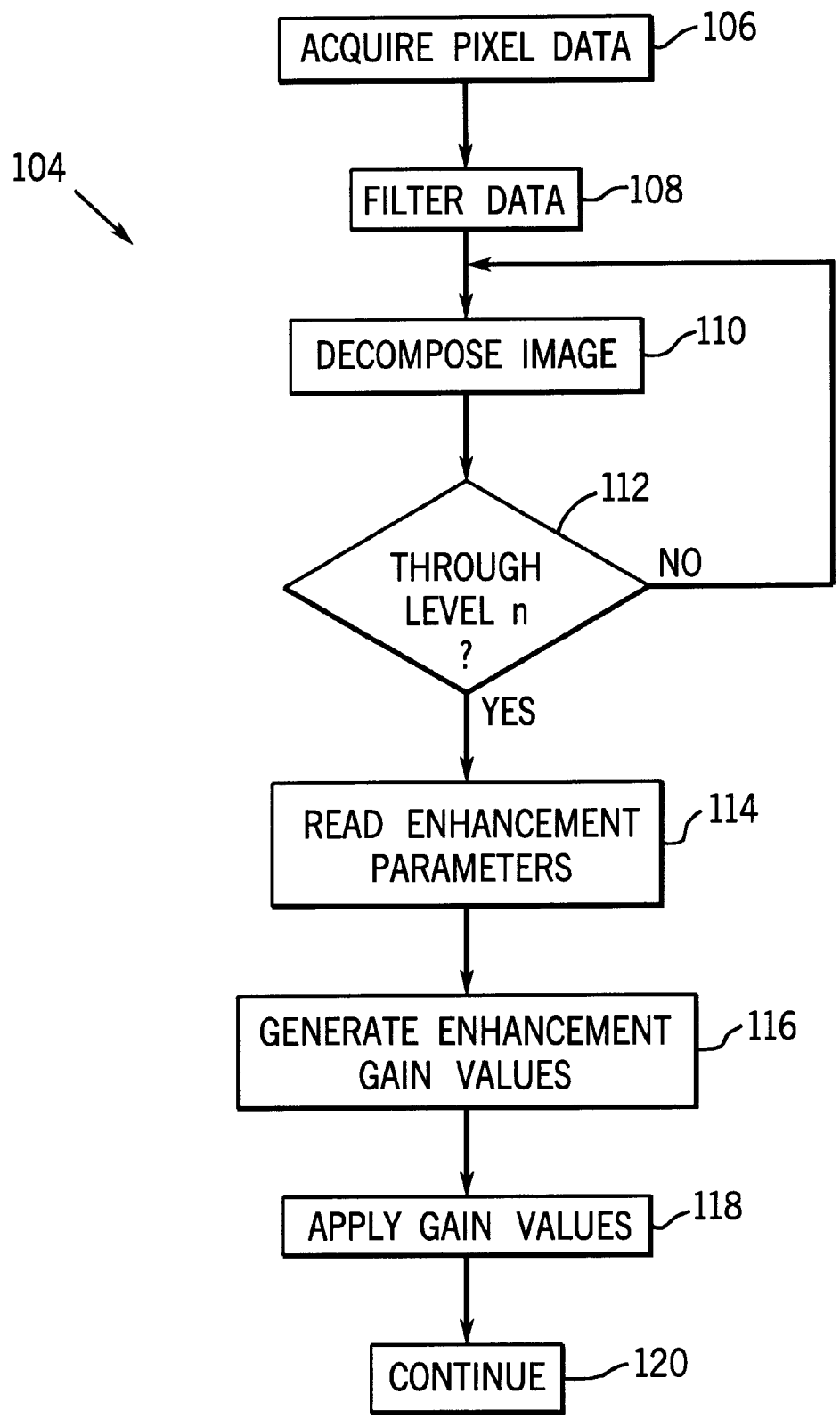
FIG. 4 is a block diagram illustrating steps in exemplary control logic for enhancing the image of FIG. 2 based upon the decomposed or recomposed images analyzed as illustrated in FIG. 3.

FIG. 4 illustrates steps in exemplary control logic for carrying out the foregoing processing sequence. As shown in FIG. 4, the control logic, designated by reference numeral 104, begins with acquisition of the pixel data at step 106, as described above. The data is then filtered at step 108 through data acquisition circuitry 22, interface circuitry 26, and signal processing circuitry 28, such as to adjust the dynamic range of the input data, and so forth. At step 110, the image is decomposed through a level of spatial frequency as indicated above in phase 54 of FIG. 3. At step 112, signal processing circuit 28 determines whether the image has been decomposed through the desired number of spatial frequency levels, and if not, returns to step 110 for further decomposition. Once the image has been decomposed through the desired spatial frequency level, the process advances to step 114.

At step 114, signal processing circuit 28 reads any configuration parameters which have been input by the user or stored in memory circuit 30. As noted above, these may include an edge strength parameter, a spatial sensitivity function, and so forth. In addition, such parameters may include predetermined gains to be applied to specific spatial frequency images, particularly to the lower level images. Based upon the decomposed images and upon the parameters read at step 114, signal processing circuit 28 generates gain images (such as images 88, 90, and 92 in FIG. 3) as indicated at step 116. As noted above, this step preferably includes application of an algorithm whereby the gain image for levels at which particular features of interest are to be enhanced are generated based upon one or more lower spatial frequency level image. At step 118, these gain images are applied to the decomposed image at the desired spatial frequency levels, such as at the upper levels where valuable edge data would be expected to be found. Subsequently, the process continues as indicated at step 120, by reconstruction of the enhanced images through the processing described above with respect to FIG. 3.

What is claimed is:

1. A method for enhancing an image defined by a matrix of discrete pixels, the method comprising the steps of:

generating data representative of the pixels defining the image;

at least partially decomposing the image into a plurality of spatial frequency images including at least a first frequency image and a second frequency image, the first frequency image having a spatial frequency greater than the second frequency image and including data representative of the second frequency image;

generating gain data for the first frequency image based upon the second frequency image;

generating an enhanced first frequency image by applying the gain data to the first frequency image; and reconstructing an enhanced image based upon the enhanced first frequency image and the second frequency image.

2. The method of claim 1, wherein the image is decomposed by successive low pass filtering to obtain a plurality of spatial frequency images of successively smaller matrix size.

3. The method of claim 2, wherein a plurality of greater frequency images are generated, gain data are generated for each greater frequency image, and gain data for each greater frequency image is applied to the respective greater frequency image to generate a plurality of enhanced higher frequency images.

4. The method of claim 3, wherein the gain data for each respective greater frequency image is generated from at least one frequency image at a spatial frequency lower than the respective higher frequency image.

5. The method of claim 1, comprising the step of applying at least one gain to the second frequency image prior to reconstruction of the enhanced image.

6. The method of claim 1, wherein the gain data is at least partially based upon an operator selected spatial sensitivity function.

7. The method of claim 1, wherein a number of frequency levels into which the image is decomposed for generation of the gain data is operator adjustable.

8. A method for enhancement of edges in a discrete pixel image, the method comprising the steps of:

acquiring a set of pixel data representative of the image;

filtering the pixel data into a series of spatial frequency level images, the series including at least one higher frequency level image and one lower frequency level image, the first frequency image having a spatial frequency greater than the second frequency image and including data representative of the second frequency image;

deriving a gain image from the lower frequency level image;

combining the gain image and the higher frequency level image to obtain an enhanced higher frequency level image; and reconstructing an edge enhanced image based upon the enhanced higher frequency level image and the lower frequency level image.

9. The method of claim 8, wherein the set of pixel data is acquired via a digital x-ray imaging system.

10. The method of claim 8, wherein the gain image is derived from the lower frequency level image by applying values representative of the lower frequency level image into a sensitivity function.

11. The method of claim 10, wherein the gain image is derived from the lower frequency level image by applying values representative of the lower frequency level image into a sensitivity function and multiplying by an edge enhancement value.

12. The method of claim 8, wherein a plurality of higher frequency level images are included in the series, and wherein dissimilar gain images are applied to each higher frequency level image to obtain respective enhanced higher frequency level images.

13. The method of claim 12, wherein a first higher frequency level image is derived from the image and successive higher frequency level images are derived therefrom by successive low pass filtering.

14. The method of claim 13, wherein the number of higher frequency level images derived is an operator adjustable parameter.

15. The method of claim 8, comprising the further step of applying a gain to the lower frequency level image prior to reconstruction of the edge enhanced image.

16. The method of claim 8, wherein the lower frequency level image is generated by successively decomposing an initial lower frequency level image into a series of lower frequency level images, and reconstructing the series of lower frequency level images into a processed lower frequency level image, and wherein the gain image is derived from the processed lower frequency level image.

17. The method of claim 16, wherein dissimilar gains are applied to each lower frequency level image prior to reconstructing the series of lower frequency level images into a processed lower frequency level image.

18. A discrete pixel imaging system comprising:

a data acquisition unit configured to generate pixel values representative of pixels in a discrete pixel image; and a signal processing circuit configured to receive the pixel values, to decompose the image into a series of spatial frequency images each frequency image having a spatial frequency greater than a next succeeding frequency image and including data representative of the succeeding frequency image, to derive a gain image for a first of the spatial frequency images from a second of the spatial frequency images, to apply the gain image to the first frequency image to obtain an edge enhanced image, and to reconstruct a filtered image based upon the edge enhanced image and the second frequency image.

19. The imaging system of claim 18, wherein the data acquisition unit includes an x-ray radiation source and a discrete pixel detector unit for receiving a portion of an x-ray emission from the x-ray radiation source.

20. The imaging system of claim 18, further including an operator input device for receiving operator selectable parameter data, and wherein the signal processing circuit is configured to derive the gain image based at least partially on parameter data input via the input device.

21. The imaging system of claim 18, wherein the signal processing circuit is configured to decompose the image into a plurality of spatial frequency images, and to derive dissimilar gain images for at least two of the spatial frequency images from respective lower spatial frequency images.

* * * * *